(12) United States Patent (10) Patent No.: US 8,619,842 B2
Okada et al. (45) Date of Patent: Dec. 31, 2013

(54) COMMUNICATION DEVICE, COMMUNICATION SYSTEM AND COMMUNICATION METHOD

(75) Inventors: Hideo Okada, Kawasaki (JP); Tomohiro Aoyagi, Nagano (JP); Koichi Oikawa, Kawasaki (JP); Toru Kamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 13/226,869

(22) Filed: Sep. 7, 2011

(65) Prior Publication Data

US 2012/0093243 A1 Apr. 19, 2012

(30) Foreign Application Priority Data

Oct. 14, 2010 (JP) ................................. 2010-231760

(51) Int. Cl.
*H04B 1/38* (2006.01)
(52) U.S. Cl.
USPC ........... 375/220; 375/219; 375/224; 375/259; 375/295; 375/316
(58) Field of Classification Search
USPC ........... 375/219, 220, 24, 259, 260, 262, 271, 375/278, 290, 295, 297, 300, 302, 316, 322, 375/326, 340, 342, 347
See application file for complete search history.

(56) References Cited

U.S. PATENT DOCUMENTS

| 7,272,132 | B2 * | 9/2007 | Kim et al. | 370/350 |
|---|---|---|---|---|
| 7,339,922 | B2 * | 3/2008 | Ho | 370/350 |
| 7,885,244 | B2 * | 2/2011 | Bhatti et al. | 370/338 |
| 8,315,233 | B2 * | 11/2012 | Alizadeh-Shabdiz | 370/338 |
| 8,432,887 | B1 * | 4/2013 | Ding | 370/348 |
| 8,452,477 | B2 * | 5/2013 | Ergen et al. | 701/29.1 |
| 8,493,992 | B2 * | 7/2013 | Sella et al. | 370/445 |
| 2009/0022174 | A1 * | 1/2009 | Wang et al. | 370/462 |
| 2009/0201169 | A1 * | 8/2009 | D'Hont et al. | 340/825.49 |
| 2011/0110340 | A1 * | 5/2011 | Lakkis | 370/336 |
| 2011/0182262 | A1 * | 7/2011 | Patel et al. | 370/329 |
| 2011/0188391 | A1 * | 8/2011 | Sella et al. | 370/252 |
| 2011/0289175 | A1 * | 11/2011 | Lee et al. | 709/208 |
| 2011/0299423 | A1 * | 12/2011 | Shim et al. | 370/254 |
| 2012/0170562 | A1 * | 7/2012 | Sakoda | 370/338 |
| 2013/0021927 | A1 * | 1/2013 | Yokoo | 370/252 |
| 2013/0094492 | A1 * | 4/2013 | Sekiya et al. | 370/345 |
| 2013/0109314 | A1 * | 5/2013 | Kneckt et al. | 455/41.2 |
| 2013/0114580 | A1 * | 5/2013 | Saitou et al. | 370/336 |

FOREIGN PATENT DOCUMENTS

| JP | 2009-49924 A1 | 3/2009 |
|---|---|---|
| JP | 2009-260925 A1 | 11/2009 |
| JP | 2012124663 A * | 6/2012 |

\* cited by examiner

*Primary Examiner* — Hirdepal Singh
(74) *Attorney, Agent, or Firm* — Kratz, Quintos & Hanson, LLP

(57) ABSTRACT

A communication device includes: a reception unit that receives a beacon signal including an identification number of a slave unit from a master unit; a first assignment unit that performs an assignment of a first communication interval for receiving a signal from the master unit based on the number of identification numbers included in the beacon signal; and a second assignment unit that performs an assignment of a second communication interval for transmitting a signal to the master unit within a rest of time calculated by subtracting the first communication interval and a non-communication interval, which is not used for a communication with the master unit, from a signal period which is a period of the beacon signal.

7 Claims, 9 Drawing Sheets

COMMUNICATION DEVICE, COMMUNICATION SYSTEM AND COMMUNICATION METHOD

CROSS-REFERENCE TO RELATED APPLICATION

This application is based upon and claims the benefit of priority of the prior Japanese Patent Application No. 2010-231760, filed on Oct. 14, 2010, the entire contents of which applications are incorporated herein by reference.

FIELD

A certain aspect of the embodiments discussed herein is related to a communication device, a communication system and a communication method.

BACKGROUND

There has been known a communication system performing wireless communication by using a beacon signal between a master unit and a slave unit (for example, the beacon wireless communication system defined in IEEE802.15.4). The beacon signal is a signal indicating the timing of transmission/reception of a signal, and includes an identification number of the slave unit to which the data is transmitted. In the wireless communication of above standard, schedule information for managing an access time is not included in the signal transmitted from the master unit to the slave unit. Thus, the slave unit which receives a beacon signal calculates the time to access the master unit based on its own identification number included in the beacon signal and the like. The signal period of the beacon signal is divided into the interval for signal transmission from the master unit to the slave unit, the interval for signal transmission from the slave unit to the master unit, and the non-communication interval which is not used for communication.

The data signal for performing notification to the user via the slave unit is included in the signal transmitted from the master unit to the slave unit for example. The signal transmitted from the slave unit to the master unit includes a participation request to the communication with the master unit, a withdrawal request from the communication with the master unit, and a handover request among a number of master units, for example. Here, when requests of the signal transmission from a number of slave units to one master unit are issued at the same time, the access is performed by avoiding the collision by the CSMA-CA (Carrier Sense Multiple Access with Collision Avoidance) system. In the CSMA-CA system, if one slave unit is emitting the radio wave when another slave unit sends a signal, the collision between slave units is avoided by accessing the master unit after the communication is queued for a certain period which is calculated randomly.

[Patent Document 1] Japanese Laid-open Patent Publication No. 2009-49924

SUMMARY OF THE INVENTION

According to an aspect of the present invention, there is provided a communication device including: a reception unit that receives a beacon signal including an identification number of a slave unit from a master unit; a first assignment unit that performs an assignment of a first communication interval for receiving a signal from the master unit based on the number of identification numbers included in the beacon signal; and a second assignment unit that performs an assignment of a second communication interval for transmitting a signal to the master unit within a rest of time calculated by subtracting the first communication interval and a non-communication interval, which is not used for a communication with the master unit, from a signal period which is a period of the beacon signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the conventional communication method, as only one interval for signal transmission from the slave unit to the master unit is provided to one period, even though the collision is avoided by the CSMA-CA system, the number of slave units capable of transmitting a signal to the master unit is an average of two or three in one period. Therefore, when requests of signal transmission are issued from a number of slave units at the same time, there is a problem that it takes time to complete the communication, and the access efficiency is decreased.

Figure 1:
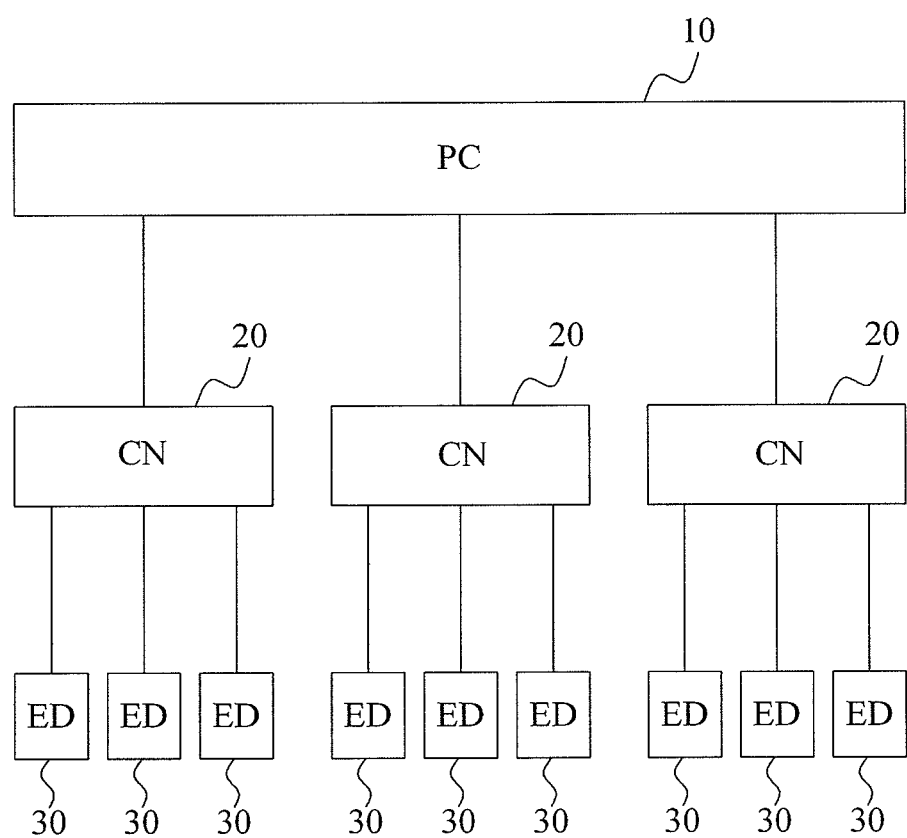
FIG. 1 is a diagram illustrating an entire configuration of a communication system.

FIG. 1 is a diagram illustrating an entire configuration of a communication system. A number of coordinators 20 functioning as a master unit in the wireless communication are coupled to a PC (Personal Computer) 10 which is an example of an information processing terminal. A number of end devices 30 (e.g. one hundred end devices) functioning as a slave unit in the wireless communication are coupled to the coordinator 20, and a star network centered around the coordinator 20 is formed. A predetermined identification number (ID number) is assigned to each of end devices 30. In this embodiment, the communication between the coordinator 20 and the end device 30 is performed by the wireless communication system defined in IEEE802.15.4. The communication between the PC 10 and the coordinator 20 can be performed by arbitrary wired or wireless communication system.

Figure 2:
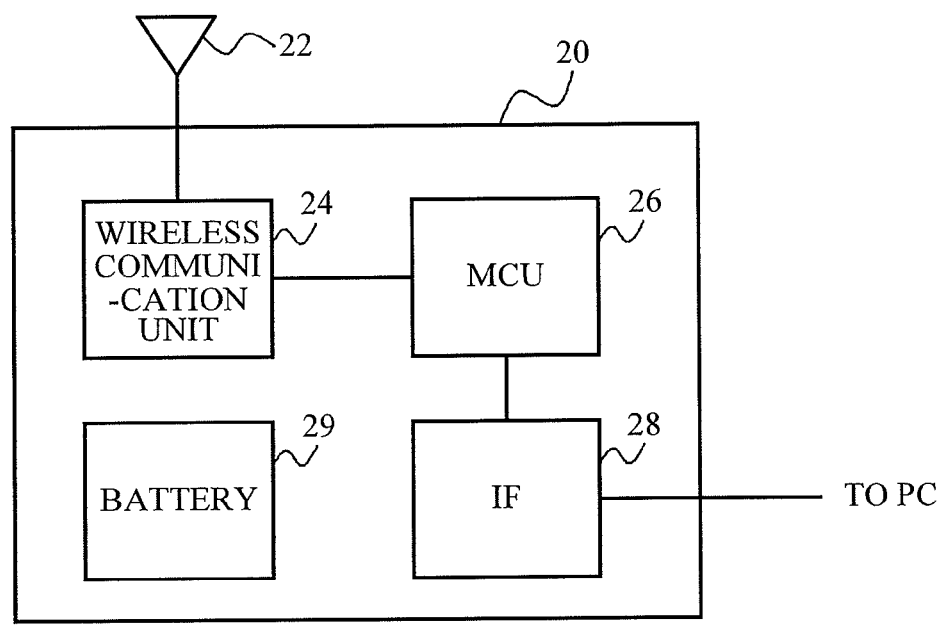
FIG. 2 is a diagram illustrating a configuration of a coordinator.

FIG. 2 is a diagram illustrating a configuration of the coordinator. The coordinator 20 includes an antenna 22, a wireless communication unit 24, an MCU (Micro Control Unit) 26, an interface (IF) 28, and a battery 29. The wireless communication unit 24 demodulates the signal received by the antenna 22, outputs it to the MCU 26, and transmits the signal from the MCU 26 to an external device via the antenna 22. The IF 28 is an interface to perform the communication between the MCU 26 in the coordinator 20 and the PC 10. The MCU 26 processes reception signals from the end device 30 and the PC 10, and functions as a control unit that controls the operation of the coordinator 20. The battery 29 functions as a power source for driving the wireless communication unit 24, the MCU 26, and the interface 28.

Figure 3:
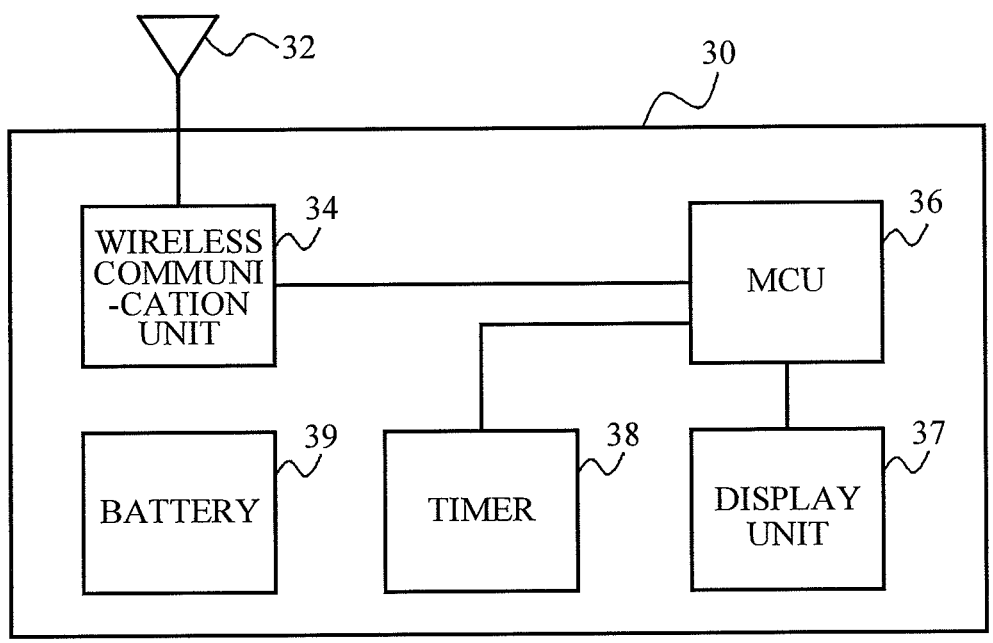
FIG. 3 is a diagram illustrating a configuration of an end device.

FIG. 3 is a diagram illustrating a configuration of the end device. The end device 30 includes an antenna 32, a wireless communication unit 34, an MCU 36, a display unit 37, a timer 38, and a battery 39. The wireless communication unit 34 demodulates the signal received by the antenna 32, outputs it to the MCU 36, and transmits the signal from the MCU 36 to an external device via the antenna 32. The MCU 36 processes the signal transmitted to and received from the coordinator 20, and functions as a control unit that controls the operation of the end device 30. In addition, a software program for managing a schedule of wireless communication is installed in the MCU 36, and the MCU 36 functions as an assignment unit that performs the assignment of communication intervals described later. The battery 39 functions as a power source for driving the wireless communication unit 34, the MCU 36, the display unit 37, and the timer 38.

The display unit 37 displays reception data from the coordinator 20, and is achieved by an electronic paper and the like for example. The timer 38 is used for the time management in the end device 30, and used for the calculation of the communication time described later.

A notification system of the number of waiting people in a hospital is considered as an example of utilization of the communication system illustrated in FIG. 1 through FIG. 3. The end device 30 is handed out to the patient at the reception. The ID number of the end device is associated with the patient, and the association between the ID number and the patient's name is registered in the PC 10. In the PC 10, a list of order of medical examinations of all patients, to whom end devices 30 are handed out, is managed, and data of the list is sent to end devices 30 of patients via the coordinator 20 every time when the list is updated according to the end of the medical examination. The latest order of medical examinations of patients (the number of waiting people) is displayed on the display unit 37 of the end device 30 that the patient carries. This enables the patient to estimate the patient's own turn to have the medical examination, and a rough time to the medical examination. Coordinators 20 are located in waiting rooms for example, and maintain the communication state by performing the handover process between coordinators 20 when the patient moves. After the medical examination and the payment are finished, the patient gives back the end device 30 to the hospital, and the communication withdrawal process is carried out to the returned end device 30 by the hospital.

Figure 4:
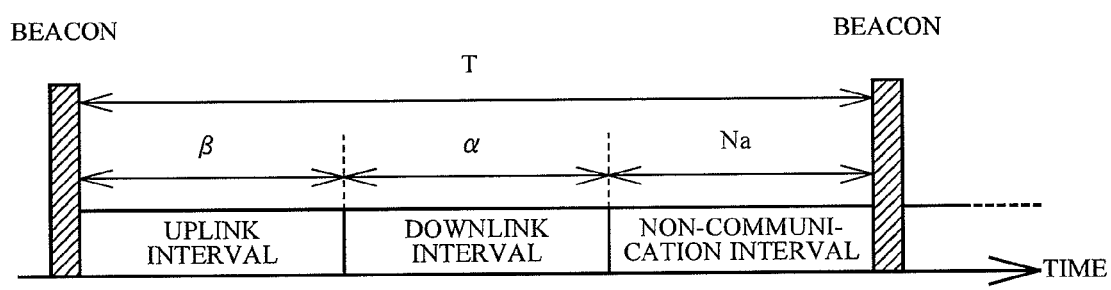
FIG. 4 is a conceptual diagram illustrating a configuration of communication intervals defined by a beacon signal.

FIG. 4 is a conceptual diagram illustrating a configuration of communication intervals defined by the beacon signal. The beacon signal is transmitted from the coordinator 20 to the end device 30 at intervals of a certain period T. The beacon signal includes the ID number of the end device 30 which becomes the object to which the coordinator 20 sends data. In addition, the beacon signal does not include the schedule information for managing the access time between the coordinator 20 and the end device 30. Thus, the end device 30 calculates the time to access the coordinator 20 based on the received beacon signal.

The communication interval between beacon signals is divided into an uplink interval $\beta$, a downlink interval $\alpha$, and a non-communication interval Na in this order from the start of period. The downlink interval $\alpha$ corresponding to a first communication interval is used for transmitting the signal from the coordinator 20 to the end device 30, and is an interval in which the data of the number of waiting patients is notified of to the end device 30 in the above-described example. The non-communication interval Na is an interval in which the communication is not performed between the coordinator 20 and the end device 30.

The uplink interval $\beta$ corresponding to a second communication interval is used for transmitting the signal from the end device 30 to the coordinator 20, and in the uplink interval $\beta$, at least one of a participation request signal, a withdrawal request signal and a handover request signal is transmitted for example. The participation request signal includes a signal requesting the participation to the communication with the coordinator 20 for example. The withdrawal request signal includes a signal requesting the withdrawal from the communication with the coordinator 20 for example. The handover request signal includes a signal requesting a handover process between coordinators 20 for example.

Figure 5:
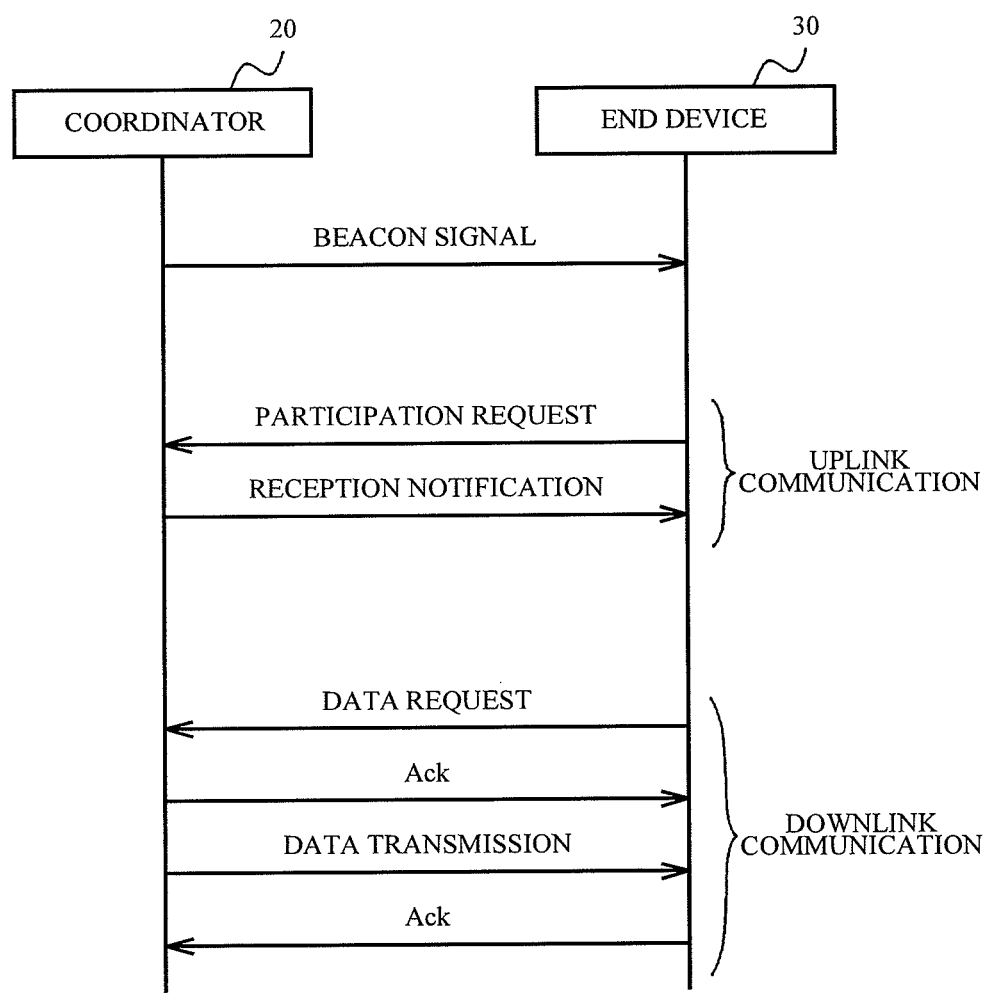
FIG. 5 is a sequence diagram of transmission and reception of signals between the coordinator and the end device.

FIG. 5 is a sequence diagram of transmission and reception of a signal between the coordinator 20 and the end device 30. First, the beacon signal is transmitted from the coordinator 20 to the end device 30. Then, in the uplink communication, the signal from the end device 30 to the coordinator 20 (the participation request signal in this example) is transmitted, and the reception notification signal is transmitted to the end device 30 from the coordinator 20 which received the signal from the end device 30. Then, in the downlink communication, the data request signal is transmitted from the end device 30 to the coordinator 20. Then, the Ack (Acknowledgement) signal, which is a notification of the reception of the data request, and data are transmitted to the end device 30 from the coordinator 20 which received the data request signal. Finally, the Ack signal which reports the reception of data is transmitted from the end device 30 to the coordinator 20.

Here, the process in a case where access requests are issued to one coordinator 20 from a number of end devices 30 at the same time in the uplink interval becomes a problem. If two or three end devices 30 access to one coordinator 20 at the same time, the signal transmission to all end devices 30 can be completed within one communication interval by avoiding a collision by the above-described CSMA-CA system. However, when the number of concurrent accesses exceeds it, it is impossible to complete the signal transmission to all end devices 30 within one communication interval. As the end device 30 which failed in the communication tries to access the coordinator 20 again in the next beacon signal period, there is a case that it takes a lot of time till all communication is completed.

For example, in the above-described notification system of the number of waiting people in the hospital, a case where the communication system goes down and participation requests are issued from a number of slave units (e.g. more than one hundred slave units) at the same time just after the system recovery is considered as above-described case. For example, if the period of the beacon signal is 0.5 seconds and the participation of two end devices 30 is possible within one period, it takes 25 seconds till all end devices 30 return to the communication. In view of above problems, in this embodiment, a description will be given of a communication system in which an assignment of communication intervals is improved.

Figure 6:
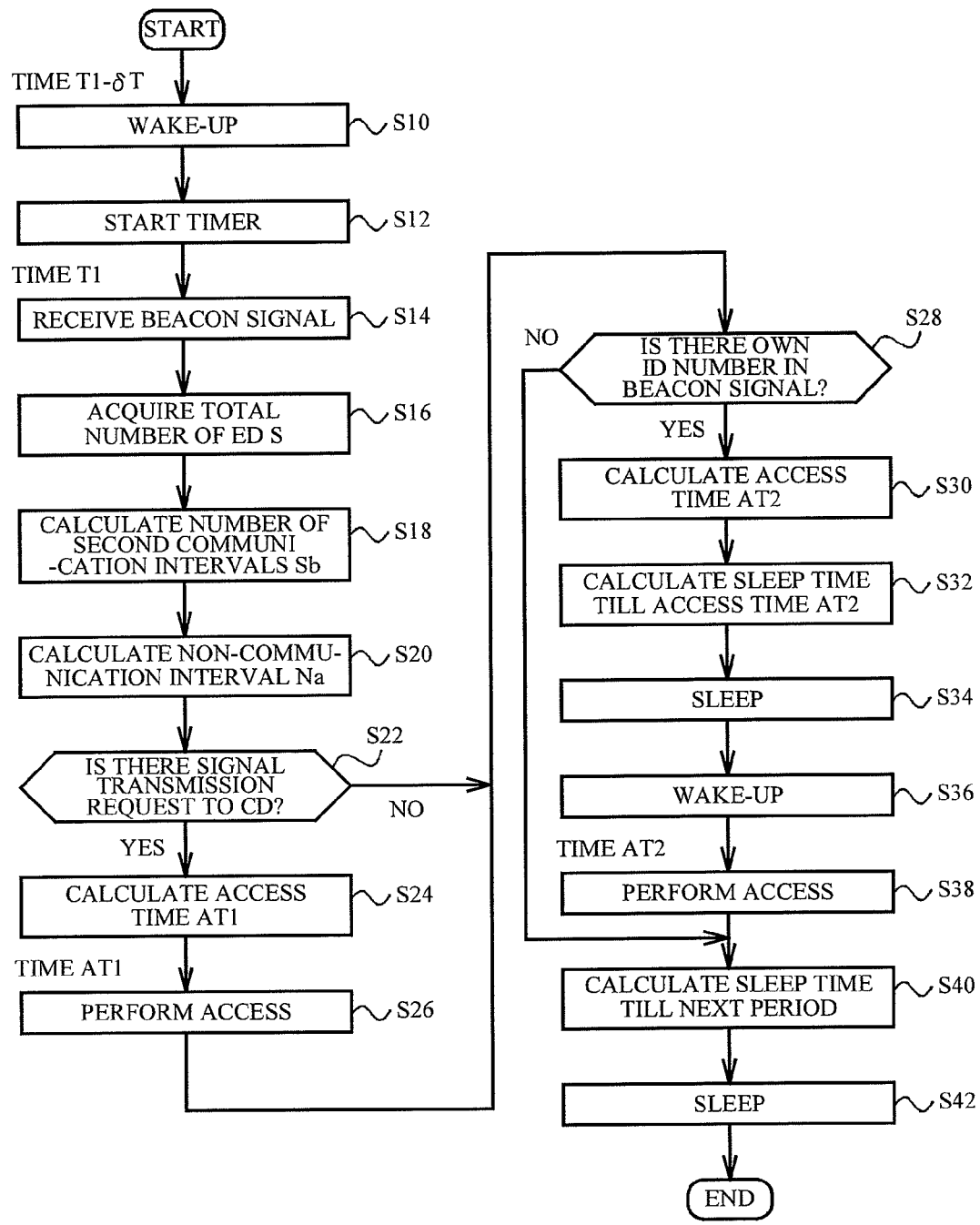
FIG. 6 is a flowchart illustrating an operation of the end device.

FIG. 6 is a flowchart illustrating an operation of the end device. Here, a length of the communication interval is preliminarily determined in each of the uplink interval, the downlink interval, and the non-communication interval. That is to say, in the conceptual diagram of FIG. 4, the length of each interval is a tripartition of the beacon signal period, but the time actually used for the communication is less than the length of each interval. Thus, assume that the signal period is T, the length of one downlink interval is $\alpha$, the length of one uplink interval is $\beta$, and the length of the non-communication interval which should be minimally-secured is Nm. In this embodiment, there is a case that a number of uplink intervals and a number of downlink intervals are set. In addition, in the description hereinafter, the end device 30 is described as the part executing the operation, but the actual calculation and the signal processing are executed by the MCU 36 of the end device 30. In addition, in the description hereinafter, there is a case that the end device is abbreviated as the ED and the coordinator is abbreviated as CN.

When a predetermined time (T1-δT) comes, the end device 30 wakes up (step S10), and starts the timer 38 (step S12). Then, the end device 30 receives the beacon signal from the coordinator 20 (step S14). Assume that the time when the end device 30 receives the beacon signal is a reference time T1. Then, the end device 30 reads out a list of ID numbers in the beacon signal, and acquires the number of ID numbers S (hereinafter, referred to as the ED number) included in the beacon signal (step S16). Then, the end device 30 calculates the number of uplink intervals Sb based on the above-described ED number S and the length of each communication interval preliminarily determined (step S18), and calculates the final length of the non-communication interval Na (step S20). Hereinafter, a description will be given of processes in the step S18 and the step S20 in detail.

Figure 7A:
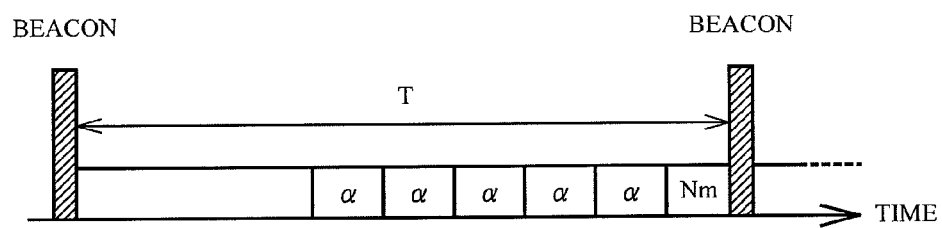
FIGS. 7A through 7C are diagrams for explaining a process of assigning communication intervals.
Figure 7B:
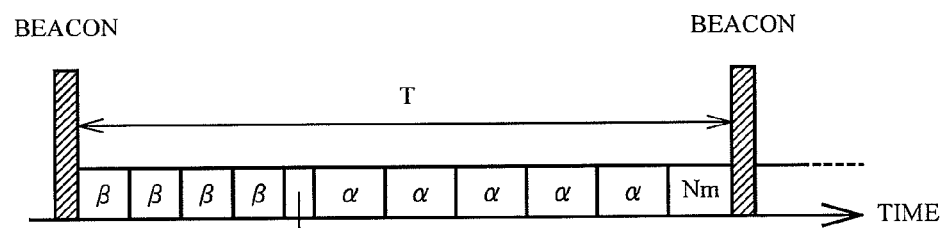
Figure 7C:
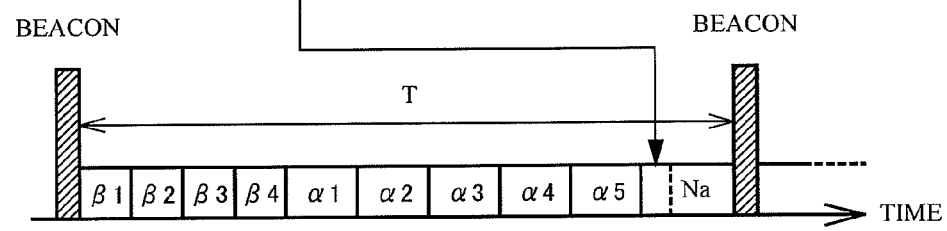

FIG. 7A through FIG. 7C are diagrams for explaining procedures of assigning communication intervals within the signal period of the beacon signal. Here, a description will be given by using a case that the number of EDs included in the beacon signal is five. First, the minimum value of the non-communication interval Nm and an interval of which the length is calculated by multiplying the length of the downlink interval $\alpha$ by the ED number S are secured in the beacon period T (FIG. 7A). Then, the rest of interval calculated by subtracting above intervals from the beacon period T is divided by the length of the uplink interval $\beta$, and the number of uplink intervals which can be set is calculated (FIG. 7B). That is to say, the number of uplink intervals Sb is calculated by a following formula.

$$Sb = (T-(\alpha \times S)-Nm)/\beta \quad (1)$$

Here, the Sb is a positive integer, and the number after the decimal point is rounded down.

Then, the rest of time calculated by subtracting the secured uplink intervals from the above-described rest of interval is added to the minimum value of the non-communication interval Nm (FIG. 7C). The final length of the non-communication interval Na is calculated from a following formula.

$$Na = T-((S \times \beta)+(Sb \times \beta)) \quad (2)$$

In the example of FIGS. 7A through 7C, assume that T is equal to 500 ms, $\alpha$ is equal to 55 ms, $\beta$ is equal to 40 ms, and Nm is equal to 50 ms. As a result, Sb is calculated to be 4, and Na is calculated to be 65 ms. Values of T, $\alpha$, and $\beta$ may be arbitrarily determined within the range of the positive number greater than 0. Nm is arbitrarily determined within a range equal to or greater than 0 (Nm may be equal to 0).

Back to FIG. 6, the end device 30 determines whether there is a signal transmission request to the coordinator 20 (step S22). When there is a signal transmission request, the end device 30 calculates the access time AT1 of the uplink communication to the coordinator 20 based on the length of the uplink interval $\beta$ and the number of uplink intervals Sb calculated in the above process (step S24). Then, the end device 30 performs the access to the coordinator 20 at the access time AT1 (step S26). When there is not a signal transmission request in the step S22, the processes of the steps S24 and S26 are not executed.

A description will now be given of a method of calculating the access time AT1. The calculation of the access time means that the end device 30 selects one of uplink intervals illustrated in FIG. 7C as the communication interval to access the coordinator 20, and assigns it to itself. A method using the own ID number, and the method using a random function may be a method of selecting the communication interval.

When using the own ID number, the end device 30 calculates a remainder by dividing the ID number (integer) by the number of uplink intervals Sb, and selects the communication interval corresponding to the remainder. For example, in the example of FIG. 7C, as the number of intervals Sb is 4, a remainder becomes either of 0 through 3. The uplink intervals are defined as $\beta 1$, $\beta 2$, $\beta 3$ and $\beta 4$ from the left side, and when the remainder is 0, $\beta 1$ is selected, when the remainder is 1, $\beta 2$ is selected, when the remainder is 2, $\beta 3$ is selected, and when the remainder is 3, $\beta 4$ is selected.

As a result, the access time AT1 of the uplink communication is calculated by a following formula (the own ID number is expressed by ID).

$$AT1 = T1+(ID \% Sb) \times \beta \quad (3)$$

ID % Sb represents a remainder calculated by dividing ID by Sb.

When using a random function, a remainder is calculated by dividing a given value (integer) calculated by the random function instead of the ID number by the number of uplink intervals Sb, and the communication interval is selected based on the remainder in the same manner as the case using the ID number. As a result, the access time AT1 of the uplink communication is calculated by a following formula (A given value calculated by the random function is expressed with Rn).

$$AT1 = T1+(Rn \% Sb) \times \beta \quad (4)$$

As described above, the end device 30 can calculate the access time AT by selecting one of selectable uplink intervals by using the own ID number or the random function. The selection of the uplink interval may be carried out with methods other than the above methods. However, it is preferable to decide the method of selecting the uplink interval so that the uplink intervals are evenly assigned among slave units so that the communication interval does not overlap with other slave units.

Back to FIG. 6 again, the end device 30 determines whether its own ID number is included in the beacon signal (step S28). When the own ID number is included in the beacon signal, the end device 30 calculates the access time AT2 of the downlink communication to the coordinator 20 (step S30). The access time AT2 is calculated based on the length of the downlink interval $\alpha$, the length of the uplink interval $\beta$, the number of uplink intervals Sb, and the order of the own ID number listed in the beacon signal.

As illustrated in FIG. 7C, the downlink interval $\alpha$ is assigned subsequent to all of uplink intervals. The end device 30 selects one of downlink intervals a based on the order of its own ID number listed in the beacon signal, and assigns the selected downlink interval to itself. For example, the access time AT2 of the downlink communication is calculated by the following formula (the order of the own ID number listed is expressed by N).

$$AT2 = T1 + Sb \times \beta + (N-1) \times \alpha \quad (5)$$

For example, in the example of FIG. 7C, the number of ID numbers included in the beacon signal (ED number) is 5, and five downlink intervals (α1 through α5) are set. Here, when the own ID number is listed in the second of five for example, the end device 30 selects the downlink interval α2 which is located second from the left in the diagram. The assignment of the communication interval can be carried out also in a case where the order of the own ID number listed is other than the second.

Back to FIG. 6, the end device 30 calculates the sleep time between the present time and the access time AT2 (step S32), and sleeps (step S34). When the sleep time passes, the end device 30 wakes up (step S36), and performs the access to the coordinator 20 at the access time AT2 (step S38). The end device 30 does not execute processes of steps S30 through S38 when its own ID number is not included in the beacon signal in the step S28.

Then, the end device 30 calculates the sleep time till the next period (step S40). After that, the end device 30 sleeps till the timing of wake-up in the next period (step S10) comes (step S42). As described above, as the end device 30 calculates the access time AT1 of the uplink communication and the access time AT2 of the downlink communication, it is possible to perform the communication with the coordinator 20 at the access time.

Figure 8:
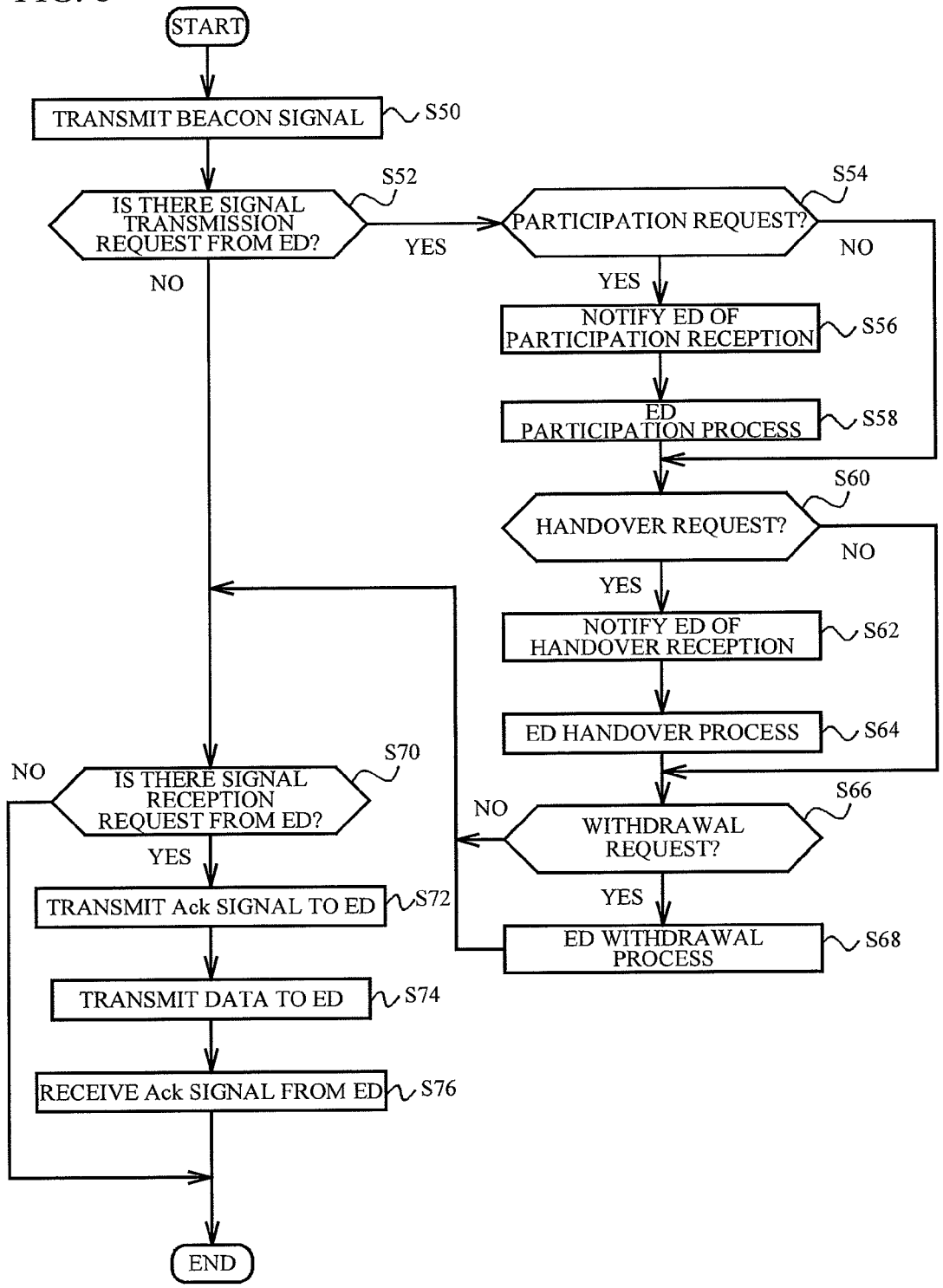
FIG. 8 is a flowchart illustrating an operation of the coordinator.

FIG. 8 is a flowchart illustrating an operation of the coordinator. The coordinator 20 is described as a part executing the operation in the description, but the actual calculation and the signal processing are executed by the MCU 26 in the coordinator 20.

The coordinator 20 transmits the beacon signal to the end device 30 (step S50). Then, the coordinator 20 determines whether there is a signal transmission request from the end device 30 (corresponding to the step S26 in FIG. 6) (step S52). When there is a signal transmission request, the coordinator 20 determines whether the request from the end device 30 is a participation request (step S54). When the request is the participation request, the coordinator 20 notifies the end device 30 of the participation reception (step S56), and executes the participation process of the end device 30 (step S58). When the request is not the participation request, steps S56 and S58 are not executed.

Then, the coordinator 20 determines whether the request from the end device 30 is a handover request (step S60). When the request is the handover request, the coordinator 20 notifies the end device 30 of the handover reception (step S62), and executes the handover process of the end device 30 (step S64). When the request is not the handover request, steps S62 and S64 are not executed.

Then, the coordinator 20 determines whether the request from the end device 30 is a withdrawal request (step S66). When the request is the withdrawal request, the coordinator 20 executes the withdrawal process of the end device 30 (step S68). The notification to the end device 30 is not carried out at this time. When the request is not the withdrawal request, the step S68 is not executed. As described above, in steps S52 through S63, the process corresponding to the signal transmission from the end device 30 (uplink communication) is executed by the coordinator 20.

Then, the coordinator 20 determines whether there is the signal reception request from the end device 30 (corresponding to the step S38 in FIG. 6) (step S70). When there is the signal reception request, the coordinator 20 transmits the Ack signal to the end device 30 (step S72), and transmits data (step S74). After that, the coordinator 20 receives the Ack signal from the end device 30 (step S76). As described above, in steps S70 through S76, the process corresponding to the signal transmission to the end device 30 (downlink communication) is carried out by the coordinator 20.

According to the communication system in accordance with the first embodiment, uplink intervals β are assigned within the rest of time calculated by subtracting downlink intervals α which are assigned first and the non-communication interval Nm from the signal period defined by the beacon signal. The assignment of downlink intervals a and the non-communication interval Nm is carried out by the MCU 36 functioning as a first assignment unit, and the assignment of uplink intervals β is carried out by the MCU 36 functioning as a second assignment unit. Moreover, the assignment of uplink intervals β is carried out so that the number of intervals Sb becomes as many as possible (so that the uplink intervals are secured as many as possible). According to this, it is possible to assign uplink intervals β efficiently according to the length of the downlink interval α.

Figure 9A:
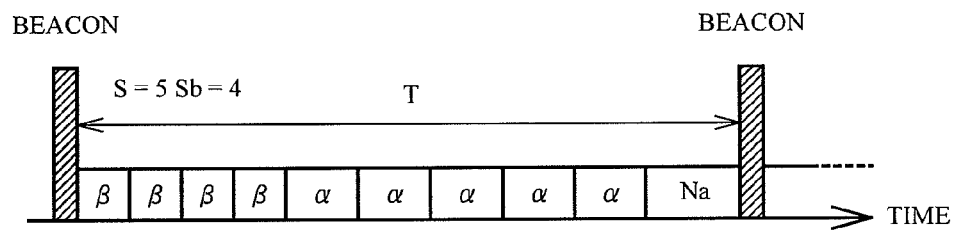
FIGS. 9A through 9D are diagrams to compare the assignment state of communication intervals.
Figure 9B:
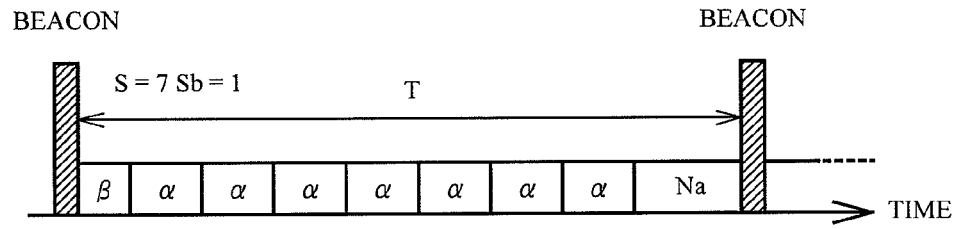
Figure 9C:
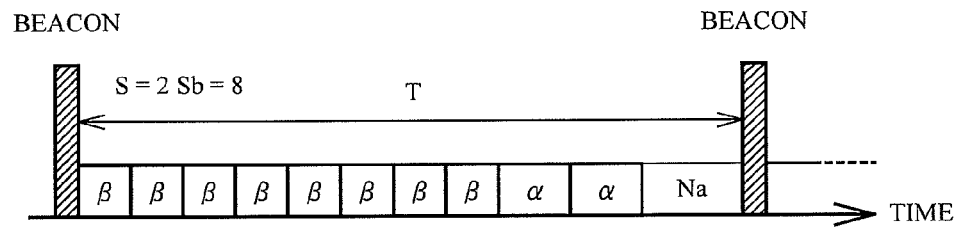
Figure 9D:
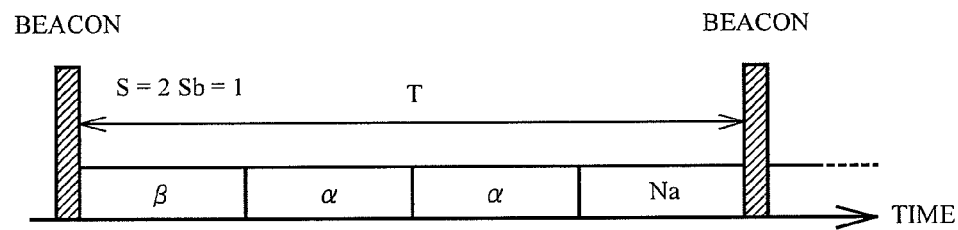

FIG. 9A through FIG. 9D are diagrams to compare the assignment state of communication intervals. As same with the first embodiment, assume that T is equal to 500 ms, α is equal to 55 ms, β is equal to 40 ms, and Nm is equal to 50 ms. FIG. 9A illustrates a case where the number of EDs included in the beacon signal is 5 as illustrated in FIG. 7C. FIG. 9B illustrates a case where S is equal to 7, and Sb is equal to 1. FIG. 9C illustrates a case where S is equal to 2, and Sb is equal to 8. FIG. 9D illustrates an assignment by the method in accordance with the comparison example (in a case of S=2), and each communication interval is assigned evenly.

Comparing FIG. 9A through FIG. 9C with FIG. 9D, although the number of uplink intervals β is 1, which is same as that of the comparison example, in FIG. 9B, the number of uplink intervals β is larger than that of the comparison example in other cases. For example, in the participation process of the end device 30 in IEEE802.15.4 standards described previously, the participation of an average of two end devices within one interval is expected by avoiding a collision by the CSMA-CA method. Therefore, as the number of end devices 30 capable of participating within one period of the beacon signal is 10 in case of FIG. 9A (Sb=5), and is 16 in case of FIG. 9C (Sb=8), it is increased largely compared to the comparison example (two). As a result, even in a case where a number of end devices 30 (e.g. one hundred end devices) issue the participation request at the same time just after the recovery from the system down, it is possible to reduce the time to complete all the participation processes largely compared to the comparison example.

As described above, according to the communication system in accordance with the first embodiment, it is possible to improve the access efficiency from the end device 30 to the coordinator 20. This is not limited to the participation process, and is also applied to a withdrawal process and a handover process.

In addition, according to the communication system in accordance with the first embodiment, the assignment of the downlink interval α is carried out based on the number of ID numbers included in the beacon signal. According to this, it is possible to give a unique communication interval to each of the end devices 30 of which the ID number is listed in the beacon signal, and to avoid the collision among end devices 30 in the downlink communication. However, the method of assigning the uplink interval β in accordance with the present embodiment can be applied to cases other than the case where the assignment of the downlink interval α is carried out based on the number of ID numbers included in the beacon signal.

In the present embodiment, a description was given by using a wireless communication based on IEEE802.15.4 standards as an example, but the communication system in accordance with the present embodiment can be applied to the beacon wireless communication system other than that described above. However, the communication system in accordance with the present embodiment is especially preferable for the communication where the schedule information in which the access time is defined is not included in the transmission signal from the master unit to the slave unit (the communication where the data quantity is relatively small). This is because the access time preferable to access the master unit can be calculated on the slave unit side without using the schedule information, according to the present communication system. In addition, as the schedule information of the access is not managed on the master unit side, it is possible to reduce the load on the master unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A communication device comprising:
   a reception unit that receives a beacon signal including an identification number of a slave unit from a master unit;
   a first assignment unit that performs an assignment of a first communication interval for receiving a signal from the master unit based on the number of identification numbers included in the beacon signal; and
   a second assignment unit that performs an assignment of a second communication interval for transmitting a signal to the master unit within a rest of time calculated by subtracting the first communication interval and a non-communication interval, which is not used for a communication with the master unit, from a signal period which is a period of the beacon signal.

2. The communication device according to claim 1, wherein when the signal period is T, the number of identification numbers is S, a length of one first communication interval is .alpha., a length of one second communication interval is .beta., a minimum time of the non-communication interval is Nm, and the number of assignable second communication intervals is Sb, the second assignment unit calculates Sb by a following formula:

$Sb = T-(\alpha \times S)-Nm)/\beta$ (the number after the decimal point is rounded down).

3. The communication device according to claim 1, wherein the second assignment unit calculates a time to perform a signal transmission to the master unit based on the length of one second communication interval and the number of second communication intervals.

4. The communication device according to claim 1, wherein the first assignment unit calculates, in a case where an own identification number of the communication device is included in the beacon signal, a time to perform a signal reception from the master unit based on the length of one first transmission interval, the length of one second communication interval and the order of the own identification number listed in the beacon signal.

5. The communication device according to claim 1, wherein the transmission signal to the master unit includes at least one of a participation request signal, a withdrawal request signal and a handover request signal, the participation request signal requesting a participation to a communication with the master unit, the withdrawal request signal requesting a withdrawal from a communication with the master unit, and the handover request signal requesting a handover process between master units.

6. A communication system comprising:
   a slave unit; and
   a master unit that transmits a beacon signal including an identification number of the slave unit to the slave unit, wherein
   the slave unit includes:
      a first assignment unit that performs an assignment of a first communication interval for receiving a signal from the master unit based on the number of identification numbers included in the beacon signal; and
      a second assignment unit that performs an assignment of a second communication interval for transmitting a signal to the master unit within a rest of time calculated by subtracting the first communication interval and a non-communication interval, which is not used for a communication with the master unit, from a signal period which is a period of the beacon signal.

7. A communication method which performs a communication between a master unit and a slave unit by using a beacon signal including an identification number of the slave unit, the communication method comprising:
   performing an assignment of a first communication interval for performing a signal transmission from the master unit to the slave unit based on the number of identification numbers included in the beacon signal; and
   performing an assignment of a second communication interval for performing a signal transmission from the slave unit to the master unit within a rest of time calculated by subtracting the first communication interval and a non-communication interval, which is not used for a communication with the master unit, from a signal period which is a period of the beacon signal.

* * * * *